United States Patent [19]

Herz

[11] Patent Number: 5,551,034

[45] Date of Patent: Aug. 27, 1996

[54] SYSTEM FOR SYNCHRONIZING REPLICATED TASKS

[75] Inventor: Dominique Herz, L'Hay Les Roses, France

[73] Assignee: Cegelec, Levallois-Perret, France

[21] Appl. No.: 178,886

[22] Filed: Jan. 7, 1994

[30] Foreign Application Priority Data

Jan. 8, 1993 [FR] France ..................... 93 00147

[51] Int. Cl.$^6$ ..................................... G06F 9/46
[52] U.S. Cl. ................. 395/650; 395/550; 364/DIG. 1; 364/271.3; 364/281.7
[58] Field of Search ................. 395/550, 650, 395/840, 878

[56] References Cited

U.S. PATENT DOCUMENTS

| | | | |
|---|---|---|---|
| 4,577,272 | 3/1986 | Ballew et al. | 395/650 |
| 4,816,989 | 3/1989 | Finn et al. | 364/DIG. 1 |
| 5,168,443 | 12/1992 | McLaughlin et al. | |

FOREIGN PATENT DOCUMENTS 0445954  9/1991  European Pat. Off. .

OTHER PUBLICATIONS

Computer, vol. 23, No. 10, Oct. 1990, Los Alamitos, US, pp. 33–42, K. G. Shin et al.: "Fault–tolerant clock synchronization in distributed systems".

*Primary Examiner*—Thomas M. Heckler
*Attorney, Agent, or Firm*—Sughrue, Mion, Zinn, Macpeak & Seas

[57] ABSTRACT

A method of operating a data processing system adapted for running two or more identical-data-receiving replicated tasks in parallel, in which method messages are transferred to the replicated tasks, each message including such data and a time stamp, the messages transferred to each replicated task being sequenced in chronological order so as to be processed by the replicated task in that order, and a stability time is determined for each message, which stability time defines the instant from which the replicated task may process the message, wherein the sequencing of the messages transferred to a replicated task is based on the message time stamps plus respective first time constants, and the stability times of the messages are determined on the basis of the message stamps plus respective second time constants.

4 Claims, 3 Drawing Sheets 5,551,034

SYSTEM FOR SYNCHRONIZING REPLICATED TASKS

FIELD OF THE INVENTION

The invention relates to a method of operating a data processing system adapted for running two or more identical-data-receiving replicated tasks in parallel, in which method messages are transferred to the replicated tasks, each message including such data and a time stamp, the messages transferred to each replicated task being sequenced in chronological order so as to be processed by the replicated task in that order, and a stability time is determined for each message, which stability time defines the instant from which the replicated task may process the message.

BACKGROUND OF THE INVENTION

More particularly, the invention applies to synchronizing replicated tasks residing in computers monitoring automatic processes (level 1 of the CIM model) in an industrial monitoring/control facility.

Providing active redundancy over the inputs of replicated tasks (i.e. duplicated in different processors) is a known technique for implementing fault-tolerance procedures. The replicated tasks take the same data at their inputs and they run the same program, so it is possible to switch over the outputs of the replicated tasks in the event that one of the replicated tasks fails. Consideration is given below only to replicated tasks that respond to input data only (which is in general supplied by transmitter tasks for transmitting such data, which transmitter tasks reside in other processors). For providing active redundancy, it is necessary for the replicated tasks to have the same behavior. This is obtained by ensuring that the replicated tasks take their input data in the same chronological order, i.e. that they are synchronized.

Document "ACM Computing Surveys -Vol. 22- No. 4 - December 1990: Implementing Fault-Tolerant Services Using State Machine Approach: A tutorial" by F. Schneider, discloses a system for synchronizing replicated tasks, in which system the time stamp contained in each message is constituted by a send time for the message. This send time is conventionally given by a clock of the processor housing the task that transmits the message. The ticks of the clocks of the processors (of the message-transmitting tasks) are short enough to ensure that it is not possible for two messages output by the same processor to have the same time stamp. The processors in which the replicated tasks reside also have local clocks, and the clocks of all the processors are optionally resynchronized, as is well known, so as to maintain an identical time reference from one processor to another. Document "Fault-Tolerant Clock Synchronization in Distributed Systems" - COMPUTER-IEEE- October 1990, describes procedures for synchronizing processor clocks.

The replicated task synchronization system disclosed in Document "ACM Computing Surveys . . . " operates as follows.

A single time constant is pre-determined on the basis of data transfer times measured between each transmitter task and each replicated task. The time constant is equal to the maximum measured transfer time.

The messages received by a second processor are placed in a queue in which they are sequenced in increasing order of time stamp. A stability time is calculated for each message, which time is equal to the sum of the time stamp plus the time constant. A message at the input of a processor is said to be "stable" when it is no longer possible for any other message having a stamp that is earlier than the stamp of the message to arrive at the input of the processor. Therefore, a stable message is detected when the clock of the second processor gives a time that is later than the stability time of the message. The message is then taken from the queue and the data contained in the message is supplied to the replicated task residing in the second processor.

This process is performed in the same way on the other second processor.

In this way, the replicated tasks take the data that they receive into account in identical chronological order as given by the time stamps of the messages encapsulating the data.

That known synchronization system suffers from the following drawback.

FIG. 1 is a diagram showing a monitoring/control facility comprising an operating station (PC) (level 2 of the CIM model) connected to automatic-process monitoring computers 3 (CA1, CA2) via a message transmission network 2 accepting a communications protocol, e.g. an aperiodic communications protocol. The automatic-process monitoring computers 3 are connected, via a message transmission network 4 accepting a communications protocol, e.g. a periodic communications protocol, to remote interfaces 5 (E/S1, E/S2) which receive data from or which transmit data to a physical process 6 to be monitored. In general, the data processing process connecting the remote interfaces to the automatic-process monitoring computers takes place in real time. The characteristics of the networks 2 and 4 are such that the message transmission times between the remote interfaces 5 and the processors 3 are considerably shorter than the message transmission times between the operating station 1 and the computers 3.

Because the time constant used for determining the stability time of each message is uniform for all the messages, the messages are delayed by the same time value on average. As a result, a first message (coming from the remote interface) which is part of a real time processing process and which has a transfer time that is short relative to the transfer time of a second message (coming from the operating station) can be delayed by a much longer time than the second message, if the second message has a stamp that is earlier than the stamp of the first message, even though the second message is received by the automatic-process monitoring computer after the first message. Therefore, that known replicated task synchronization system may cause the response times for the real time process to be exceeded, and it is therefore not suited to such a monitoring/control facility.

Document EP-A-0,445,954 also discloses a system for synchronizing concurrent tasks, which system is based on using virtual time stamps (counters). With that known system the stability times of the messages are not taken into account.

OBJECTS AND SUMMARY OF THE INVENTION

An object of the invention is to remedy the above-mentioned drawbacks so as to give processing certain messages priority over processing other messages, while maintaining good synchronization in message processing between the replicated tasks.

To this end, the invention provides a method of operating a data processing system adapted for running two or more identical-data-receiving replicated tasks in parallel, in which method messages are transferred to the replicated tasks, each message including such data and a time stamp, the messages transferred to each replicated task being sequenced in chronological order so as to be processed by the replicated task in that order, and a stability time is determined for each message, which stability time defines the instant from which the replicated task may process the message, wherein the sequencing of the messages transferred to a replicated task is based on the message time stamps plus respective first time constants, and the stability times of the messages are determined on the basis of the message stamps plus respective second time constants.

In this way, it is possible to minimize the waiting times for messages coming from priority tasks. As a result, the order in which the waiting messages are processed by a replicated task is different from chronological order as defined by the stamps of the messages. Also as a result, the stability times of the messages are adjusted as a function of the order in which the messages are processed.

In a particularly simple embodiment, each message contains a code identifying the source of the message, which source may be a transmitter task.

The method of the invention ensures that waiting time is reduced as much as possible for messages coming from priority tasks. If there is only one priority transmitter task, the messages from that task have a waiting time of zero prior to be being processed by the replicated tasks. Furthermore, the waiting times for messages from non-priority message-transmitting tasks are mutually equal and reduced as much as possible.

BRIEF DESCRIPTION OF THE DRAWINGS

An embodiment of the invention is described below in detail and with reference to the accompanying drawings, in which.

MORE DETAILED DESCRIPTION

Figure 4:
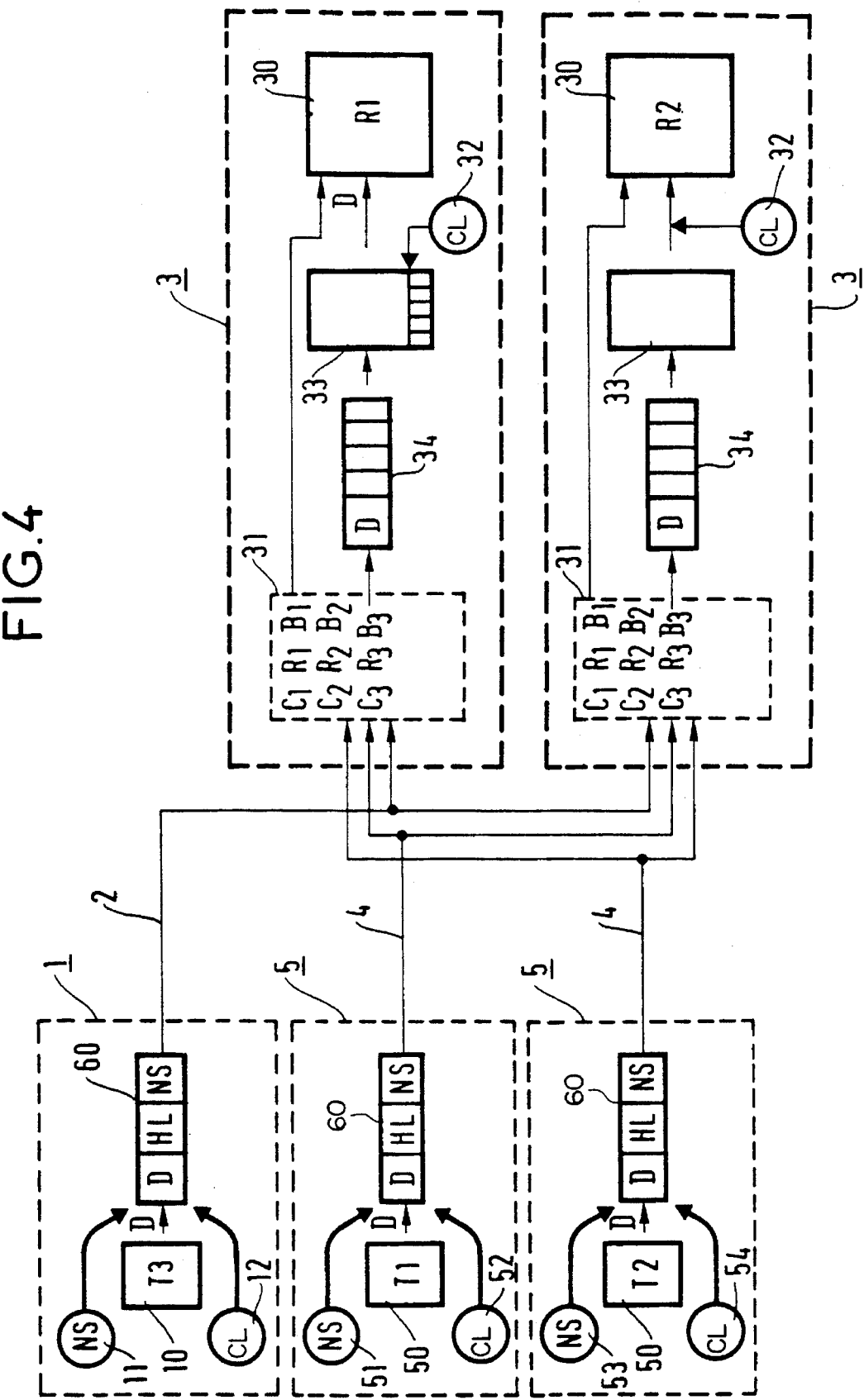
FIG. 4 is a diagram comprising functional blocks representing the task synchronization system of the invention for the monitoring/control facility of FIG. 1.

FIG. 4 shows two tasks T1 and T2, transmitting data D and referenced 50, the two tasks residing in remote interfaces 5. Each remote interface 5 is constituted conventionally by a processor provided with a memory and peripheral equipment. Each interface includes a local clock 52, 54.

A task T3 transmitting data D and referenced 10 resides in the operating station 1. The operating station is constituted by a processor provided with a memory and peripheral equipment. The operating station also includes a local clock 12.

Two replicated tasks R1 and R2, receiving data D supplied by tasks T1, T2, and T3, are referenced 30 and they reside in respective ones of the automatic-process monitoring computers 3. Each automatic-process monitoring computer 3 is also constituted by a processor provided with a memory and peripherals. Each computer includes a local clock The synchronization system for synchronizing tasks R1 and R2 is described below.

This system includes output interface tasks (not shown) distributed in the operating station 1 and in the remote interfaces 5, which output interface tasks form messages 60 at the outputs of the data-transmitting tasks 10, 50.

The output interface tasks are coupled to the transmitter tasks via input/output queues of data (not shown) so as to enable data to pass over the networks 2, and 4 to the computers 3. In this way, the structure and the operation of the transmitter tasks are independent of the synchronization of the replicated tasks.

Figure 1:
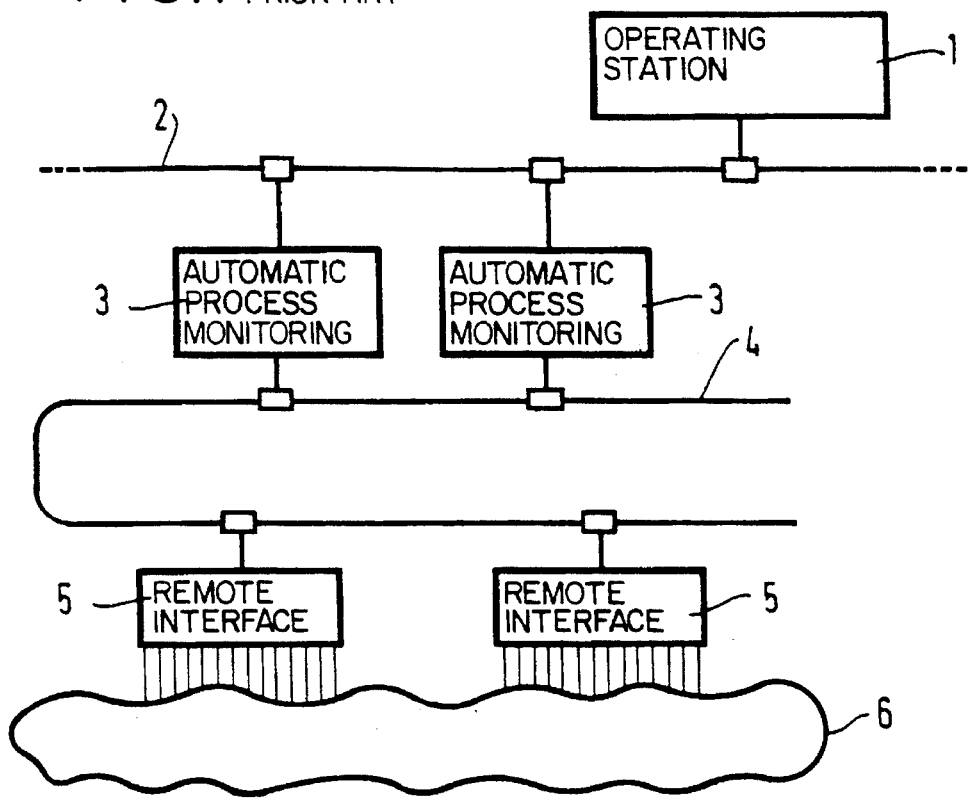
FIG. 1 shows a monitoring/control facility.
Figure 2:
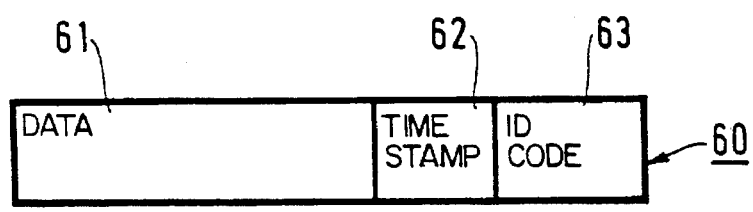
FIG. 2 shows the structure of a message.

As shown in FIG. 2, each message 60 comprises a data zone 61 in which data D supplied by a transmitter task is written, a zone 62 in which a time stamp HL is written, the time stamp being given by a local clock 12, 52, 54 at the time at which the message is formed, and a zone 63 in which a task or site identification code NS is written. Each output interface task encodes the messages that it forms, the encoding being performed using the appropriate communications protocol so that the output interface task can then send the messages over the networks 2 and 4.

In a simple embodiment, the identification code of the messages is a digital value. For example, the messages formed at the output of task T1 have an identification code equal to 1. The messages formed at the output of task T2 have an identification code equal to 2, and the messages formed at the output of task T3 have an identification code equal to 3. In this way, it is easy to differentiate between the messages 60 as a function of their respective origins.

The synchronization system for synchronizing the replicated tasks R1 and R2 includes input interface tasks distributed in the computers 3. The function of each input interface task is to enter the messages 60 received by a computer 3, optionally to delay the received messages in a queue 33, and to supply the data encapsulated in the messages to the replicated task 30 when the messages are stable.

The mode of operation of the synchronization system is described below with reference solely to one input interface task for one replicated task 30 residing in one computer 3.

The input interface task uses time constants that are pre-calculated and recorded in a memory, or that are calculated on line in the computer 3, for determining the stability times of the messages and the order in which the data supplied to the replicated task 30 is to be taken into account.

To determine the time constants, it is first necessary to measure the minimum transfer time and the maximum transfer time required for transferring an item of data D from each transmitter task 10, 50 to the replicated task 30. In the present case, $m_1$, $m_2$, and $m_3$ are the minimum transfer times required for transferring an item of data D from tasks T1, T2, and T3 to task R1. $M_1$, $M_2$, $M_3$ are the maximum transfer times required for transferring an item of data D from tasks T1, T2, and T3 to task R1. A transfer time is equal to the difference between the local reception time at which an item of data is received by a task 30 in a processor 3 and the local transmission time at which the item of data was transmitted by a task 10, 50 in a processor 1, 5.

In the embodiment of the invention, it is advisable to give priority to those messages which come from the remote interfaces 5, rather than to those messages which come from the operating station 1. Tasks T1 and T2 are therefore priority tasks.

Respective first time constants $C_1$, $C_2$, and $C_3$ are then determined for tasks T1, T2, and T3 on the basis of the following relationships, where M is equal to 2, and N is equal to 3:

$$Cj = av_{k,k=j} - \min_{k \to M+1,N}(av_k) - \max_{k \to 1,M}(diff_k) - \max_{k \to M+1,N}(diff_k)$$

for $j \to 1,M$ $$Cj = av_{k,k=j} - \min_{k \to M+1,N}(av_k) \quad \text{for } j \to M+1,N$$

if $\min_{k \to 1,M}(av_k) - \min_{k \to M+1,N}(av_k) - \max_{k \to 1,M}(diff_k) - \max_{k \to M+1,N}(diff_k) >= 0$ and $$Cj = av_{k,k=j} - \min_{k \to 1,M}(av_k) \quad \text{for } j \to 1,M$$

$$Cj = av_{k,k=j} - \min_{k \to 1,M}(av_k) + \max_{k \to 1,M}(diff_k) + \max_{k \to M+1,N}(diff_k)$$

for $j \to M+1,N$ if $\min_{k \to 1,M}(av_k) - \min_{k \to M+1,N}(av_k) - \max_{k \to 1,M}(diff_k) - \max_{k \to M+1,N}(diff_k) < 0$ where
$av_k = (m_k + M_k)/2$ for $k \to 1,N$ $diff_k = (M_k - m_k)/2$ for $k \to 1,N$.

Respective second time constants $R_1$, $R_2$, and $R_3$ are then determined for tasks $T_1$, $T_2$, and $T_3$ on the basis of the following relationship, in which the indices i and j range from 1 to 3.

$$R_i = \max(M_j - C_j) + C_i, \, j \neq i$$

Preferably, the time constants C1, C2, & C3 and R1, R2, & R3 are pre-recorded in the computer 3 so that they can be retrieved selectively using an identification code. In a variant the values $m_k$ and $M_k$ of the transfer times measured are recorded in the computer 3 so that they can be retrieved selectively using an identification code, the time constants C and R being calculated on line.

Figure 3:
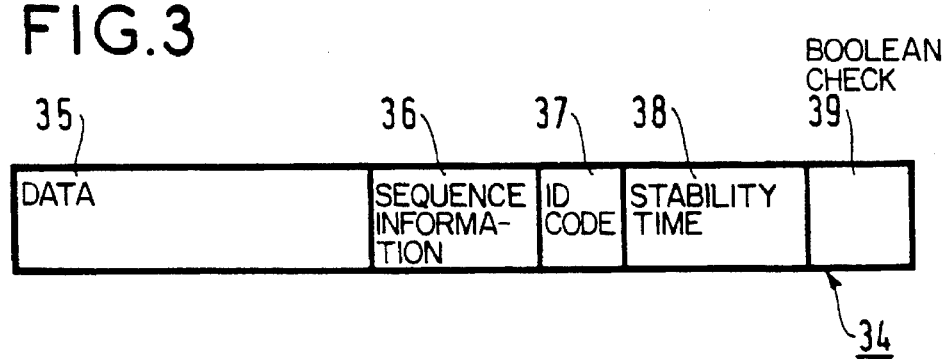
FIG. 3 shows a record in a queue of messages.

In response to the messages 60 received at the input of the computer 3, the input interface task decodes the messages and forms records 34 which are kept waiting in a queue 33. As shown in FIG. 3, each record 34 includes: a field 35 in which the data D of a message is written; a field 36 in which the following is written: the stamp HL of the message plus the constant Cj whose index j corresponds or is equal to the identification code NS of the message; a field 37 in which the identification code NS of the message is written; a field 38 in which the following is written: the stamp value HL of the message plus the time constant Rj whose index j corresponds or is equal to the identification code NS of the message; and a field 39 in which a Boolean check variable F positioned at "False" is written.

The value of field 38 of a record corresponds to the stability time of a message.

Boolean constants B are also recorded in the computer 3, which constants correspond to the identification codes. For an identification code i, the value of the Boolean constant is "True" if:

$$\max(M_j - C_j) - (m_i - C_i) > 0 \text{ for } j \neq i$$

In which case, the expression $\max(M_j - C_j) - (m_i - C_i)$ gives the maximum waiting time for an item of data from a message waiting to be stable. If such is not the case, the waiting time is zero.

The Boolean constants are used to prevent those messages which are stable from being kept waiting at the input of the processor 3.

Figure 5:
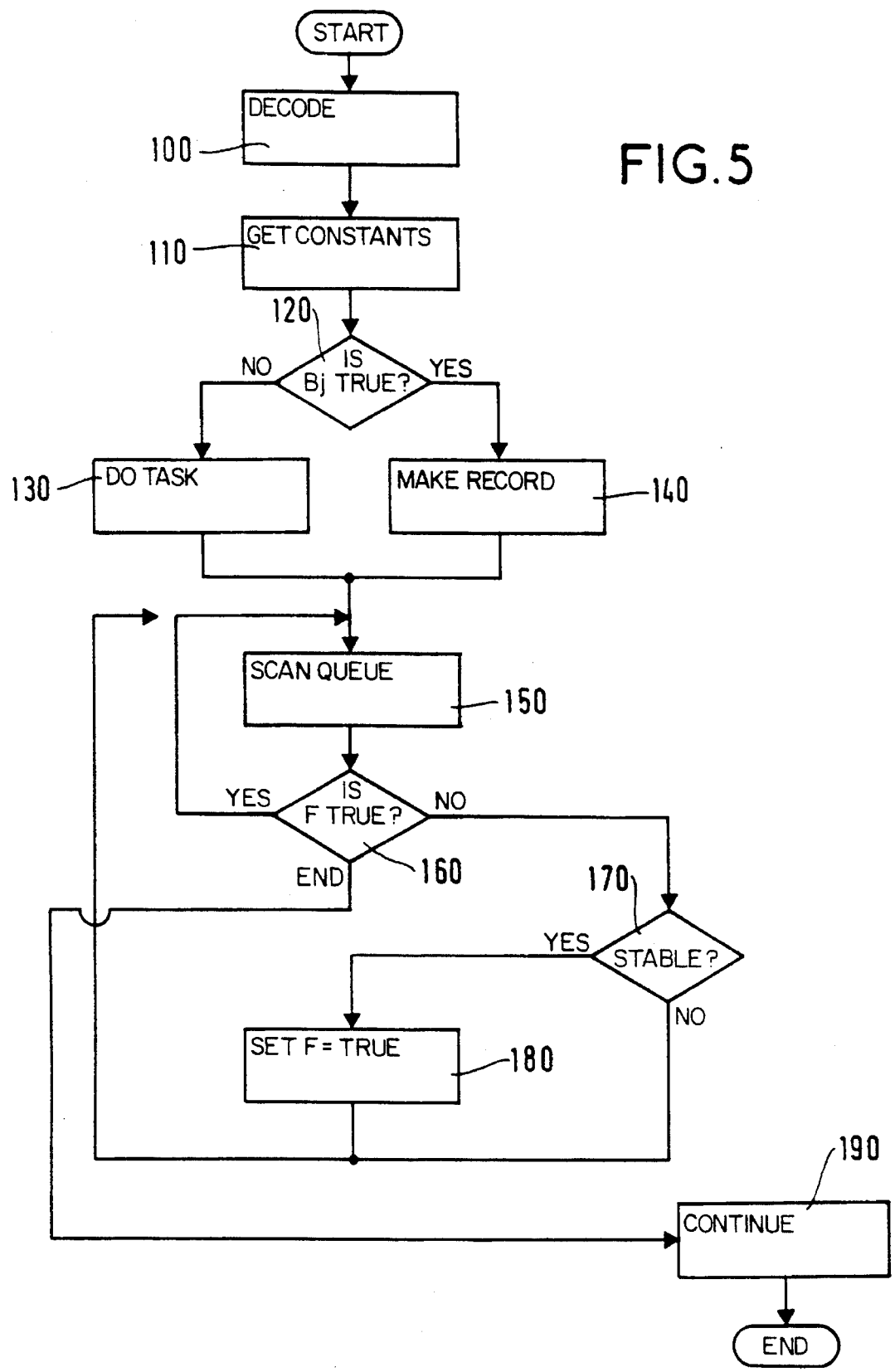
FIG. 5 is a flow chart showing a way in which stable message detection may be implemented for the synchronization system.

The operation of the input interface task is described below with reference to FIG. 5.

The messages 60 conveyed over the networks 2 and 4 are received in sequence at the input of the automatic-process monitoring computer 3 by the input interface task.

A received message 60 is decoded at 100 so as to recover the item of data D, the stamp HL, and the identification code NS of the message.

On the basis of the identification code NS, the time constants Cj, & Rj, and the Boolean constant Bj whose index j corresponds to the identification code NS are recovered at 110.

The Boolean constant Bj is compared with the value "True" at 120. If it is not equal to "True", the item of data D from the received message is supplied directly to the replicated task R1 at 130 since the message is stable. If such is not the case, a record 34 is formed on the basis of the message 60 at 140 and the record is placed in the queue 33 so that records 34 are sequenced in the increasing order of the values for their fields 36. If two consecutive records in the queue 33 have the same value for their fields 36, then the record that has the lower value for its field 37 precedes the other one in the queue.

After steps 130 and 140, the records 34 in the queue 33 are scanned at 150. For each scanned record 34, the check variable F in field 39 is compared with the value "True" at 160. If the check variable is equal to "True", the processing continues at 150 for the next record 34 until all the records have been scanned. Otherwise, the stability time in field 38 of the scanned record is compared at 170 with the current time supplied by the local clock 32 of the automatic-process monitoring computer 3. If the stability time is earlier than the current time, the check variable F of field 39 is positioned at "True" at 180, and the processing continues at 150, and otherwise at 150. When all the records 34 have been scanned in the queue 33, the processing continues at 190. In this step, if the first record 34 in the queue 33 (the one having the earlier value for its field 36) has a check variable F equal to "True", a first item of data D in field 35 of the record is supplied to task R1. The record is simultaneously removed from the queue which is reorganized accordingly. If, once again, the check variable F of the first record in the queue is equal to "True", a second item of data D in field 35 of the record is supplied to task R1 which takes it into account after the first item of data D. This procedure is repeated until the variable F is equal to "False", in which case the processing is terminated.

Steps 100 to 190 are repeated for each new message 60 received at the input of the automatic-process monitoring computer. The above-described input interface task operates in the same way for the other replicated task residing in the other automatic-process monitoring computer, it merely being necessary to adapt the time constants to the data transfer times for that computer. Therefore, the invention can easily be applied to more than two automatic-process monitoring computers and to more than two replicated tasks.

I claim:

1. A method of operating a data processing system for running two or more identical-data-receiving replicated tasks in parallel, said method comprising the steps of:

transferring messages to the replicated tasks, each message including data to be processed and a time stamp from a clock in said system;

sequencing the messages transferred to each replicated task in a chronological order so as to be processed by the replicated task in said chronological order; and determining a stability time for each message, wherein said stability time defines the time from which the replicated task may process the message, wherein in said sequencing step, said chronological order is based on the message time stamp plus a respective first time constant determined for each message, and in said determining step, the stability time of the message is based on the message time stamp plus a respective second time constant determined for said message.

2. A method according to claim 1, in which a code is allocated to each message, said code identifying a source from which said message is transferred, so that said first time constant and said second time constant can be determined on the basis of said code.

3. A method according to claim 1, in which the messages come from transmitter sources having different-level priorities, wherein the first and second time constants are calculated to minimize the waiting time for the messages coming from transmitter sources having the highest level priorities before said messages are processed by the replicated tasks.

4. A method according to claim 3, in which $T_1, T_2, \ldots, T_M$ designate message-transmitting tasks having highest level priorities and in which $T_{M+1}, \ldots, T_N$ designate message-transmitting tasks having lower level priorities, the first and second time constants for the messages from the transmitter tasks being determined by performing the following steps:

pre-measuring the minimum transfer time $m_k$ and the maximum transfer time $M_k$ required for an item of data to be transferred from each transmitter task $T_k$ to a replicated task;

calculating the first time constant Cj on the basis of the following relationships, where the index j ranges from 1 to N:

$$Cj = av_{k,k=j} - \min_{k \to M+1,N}(av_k) - \max_{k \to 1,M}(diff_k) - \max_{k \to M+1,N}(diff_k)$$

for $j \to 1,M$ $$Cj = av_{k,k=j} - \min_{k \to M+1,N}(av_k) \quad \text{for } j \to M+1,N$$

if $\min_{k \to 1,M}(av_k) - \min_{k \to M+1,N}(av_k) - \max_{k \to 1,M}(diff_k) - \max_{k \to M+1,N}(diff_k) \geq 0$ and $$Cj = av_{k,k=j} - \min_{k \to 1,M}(av_k) \quad \text{for } j \to 1,M$$

$$Cj = av_{k,k=j} - \min_{k \to 1,M}(av_k) + \max_{k \to 1,M}(diff_k) + \max_{k \to M+1,N}(diff_k)$$

for $j \to M+1,N$ if $\min_{k \to 1,M}(av_k) - \min_{k \to M+1,N}(av_k) - \max_{k \to 1,M}(diff_k) - \max_{k \to M+1,N}(diff_k) < 0$ where $av_k = (m_k + M_k)/2$ for $k \to 1,N$ $diff_k = (M_k - m_k)/2$ for $k \to 1,N$ and calculating the second time constant $R_j$ on the basis of the following relationship, the index j ranges from 1 to N:

$$R_j = \max(M_k - C_k) + Cj, \text{ for } k \neq j.$$

* * * * *